Figure 1:
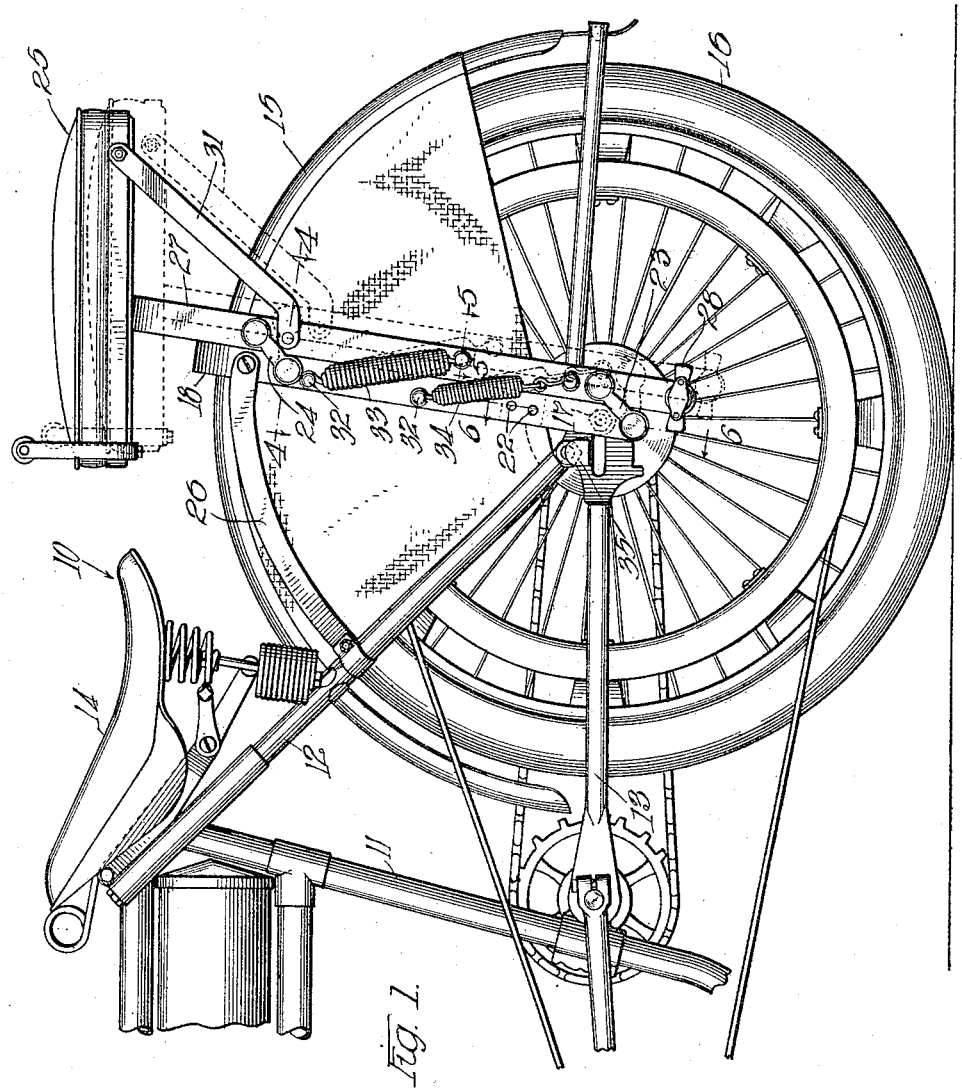

J. F. GLASER.
SEAT SUPPORT FOR VEHICLES.
APPLICATION FILED AUG. 6, 1915.

1,208,771.

Patented Dec. 19, 1916.
2 SHEETS—SHEET 1.

Witnesses:
Robert H. Weir
Arthur W. Carlson

Inventor:
John F. Glaser

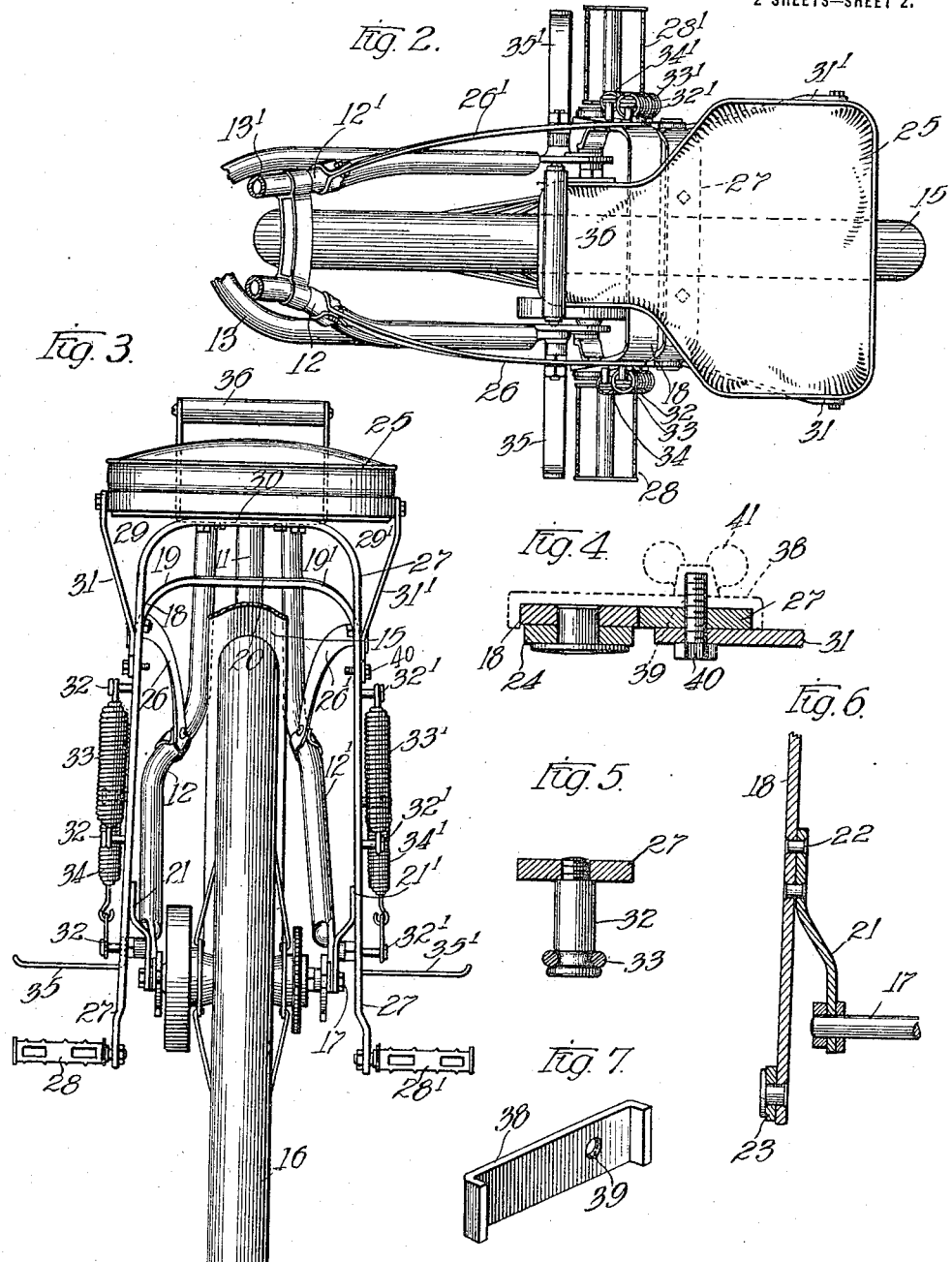

UNITED STATES PATENT OFFICE.

JOHN F. GLASER, OF OAK PARK, ILLINOIS, ASSIGNOR OF ONE-HALF TO JOHN F. BLYTHING, OF CHICAGO, ILLINOIS.

SEAT-SUPPORT FOR VEHICLES.

1,208,771.  Specification of Letters Patent. Patented Dec. 19, 1916.

Application filed August 6, 1915. Serial No. 43,915.

*To all whom it may concern:*

Be it known that I, JOHN F. GLASER, a citizen of the United States, residing at Oak Park, in the county of Cook and State of Illinois, have invented certain new and useful Improvements in Seat-Supports for Vehicles, of which the following is a specification.

My invention relates to improvements in seat supports for vehicles and has especial reference, in its application, to motor cycles, bicycles and the like.

One of the objects of my invention is to generally improve, simplify and cheapen the construction of such devices.

Another object is to provide a structure which will increase the efficiency and desirability of seat supports to produce maximum strength with minimum weight of material and to provide for the use of springs having relatively long limits of elasticity, that the riding may be made easy, smooth and comfortable.

Other and further objects of my invention will become apparent, to persons skilled in the art, from a consideration of the following description when taken in conjunction with the drawings, wherein:—

Figure 1 is a side elevation of a rear portion of a motor cycle showing my improved rear seat support applied thereto. Fig. 2 is a plan view of the same. Fig. 3 is a rear view of the same. Fig. 4 is a section of parts taken on line 4—4 of Fig. 1. Fig. 5 is a similar sectional view taken on line 5—5 of Fig. 1. Fig. 6 is a similar sectional view taken on line 6—6 of Fig. 1. Fig. 7 is a detail view of a clamp to hold the fixed and relatively movable seat supporting members together when not in use.

In all the views the same reference characters are employed to indicate similar parts.

10 represents the rear portion of a motor cycle showing parts of the main frame consisting of the braces 11, 12, 12', 13 and 13' and provided with a front saddle, or seat 14.

15 is a mud guard for the wheel 16, the latter being mounted on the stationary axle 17.

My seat support comprises a substantially vertical U-shaped part 18 fixed to the axle 17, and to the frame braces 12—12'. It is curved inwardly, at the top, as at 19 and 19' providing therebetween a relatively straight portion 20. Each of its legs is secured to the axle 17 by inwardly deflected clips 21, 21', riveted thereto as by rivets 22. On its lower end the part 18 bears pivoted links 23—23', one on each end thereof, and near the upper portion, just below the bends 19—19' it bears similar pivoted links 24—24'. It is secured to the frame members 12—12' by braces 26—26'. A similar U-shaped, substantially parallel member 27, relatively movable and somewhat longer than the stationary member 18, is movably connected to the stationary member 18 by the parallel links 23—23',24—24', a pair of links being attached to each leg of the member 27. To the lower ends of the member 27 are connected foot rests 28—28' and near its top, where it is bent, as at 29—29', there is an intermediate straight portion 30 connected to the bottom of the seat 25, near the mid portion thereof. Braces 31—31' connect the rear side portions of the seat to the respective legs 27—27' of the relatively movable seat supporting member.

Secured to the stationary member 18 and the relatively movable member 27 are spaced apart grooved studs 32—32, shown enlarged in Fig. 5, and between pairs of these studs are helical, closely wound springs 33—33', 34—34', there being a pair on each side of the seat supporting structure. These springs support the seat supporting member and seat in vertical position, being normally and yieldingly held in contact with the rear surface of the fixed member 18 by the parallel links 23—23' and 24—24', as clearly shown in Figs. 1 and 4.

The dotted lines in Fig. 1 show the lowermost positions of the seat and the seat supporting member; substantially the positions the parts assume when the rider is resting his entire weight upon the seat 25, with his feet upon the rests 28—28', against the resilient resistance of the springs 33—33' and 34—34'.

To prevent the maximum vertical movement of the seat support 27, and the accompanying seat 25, the rider may relieve the springs 34—34 of some of his weight, by resting his feet upon the fixed supports 35—35'.

A handle 36 is provided in front of the seat which the rider may seize and hold in order to properly support himself, as when the machine is passing over rough roads or running at a high rate of speed.

When the rear seat 25 is not in use and it is desired to prevent any spring action or relative movement of the parts, I prefer to use the clamp 38 shown in perspective in Fig. 7. The clamp is provided with a perforation 39 which is passed over the prolonged bolt 40 which secures the seat brace 31 to the vertically moving member 27, the clamp 38 being held in place by means of a butterfly nut 41. This clamp 38, prevents any relative movement of the members 18 and 27 due to a jar or shock from the effect of rough roads when the rider is not on the seat 25. The movement of the seat supporting member 27 is rearwardly, with reference to the fixed member 18, and downwardly against the resilient resistance of the springs 33—33' and 34—34' which tend to restore said movable members to their normal position, as shown in full lines in Fig. 1.

While I have herein shown a single embodiment of my invention, for the purpose of clear disclosure, it is manifest that many changes may be made in the general form and disposition of the parts within the scope of the appended claim.

Having described my invention, what I claim is:

A vehicle rear seat support for a cycle comprising a substantially vertical U-shaped member; having its lower end fixed to respective ends of the fixed axle of a cycle, and its upper end secured to the frame of the cycle; a substantially parallel U-shaped relatively movable member; a seat secured to the upper end thereof; a pair of parallel links pivotally connecting the respective limbs of said U-shaped members and positioned to lie on the outer sides thereof; helical tension springs, connected to the stationary member and to the movable member on the outer sides thereof, to yieldingly support the latter and to normally hold the same in close contact with the first mentioned U-shaped member.

In testimony whereof I hereunto set my hand in the presence of two subscribing witnesses.

JOHN F. GLASER.

In the presence of—
STANLEY W. COOK,
MARY F. ALLEN.

Copies of this patent may be obtained for five cents each, by addressing the "Commissioner of Patents, Washington, D. C."